United States Patent Office 2,959,564
Patented Nov. 8, 1960

2,959,564

UNSATURATED POLYESTER-DIALLYL ISOPHTHALATE COMPOSITIONS

George A. Cypher, Schenectady, N.Y., and Merrill Cohen, Marblehead, Mass., assignors to General Electric Company, a corporation of New York No Drawing. Filed Aug. 22, 1956, Ser. No. 605,487

5 Claims. (Cl. 260—45.4)

This invention relates to new and useful compositions comprising unsaturated polyesters cross-linked with certain allyl esters of polycarboxylic acids. More particularly the invention relates to such compositions which are characterized by improved and unexpected heat stability.

The use of such materials as diallyl orthophthalate or terephthalate as a cross-linking agent for unsaturated polyesters is well known and such combinations are very useful in many applications at normal temperatures. However, it has been found that the physical properties of such materials and laminates made therefrom become degraded upon heating to higher temperatures. For example, such laminates, when heated to temperatures of the order of 200° C. to 300° C., experience a marked reduction in flexural strength.

With the development and broadening of the fields in which plastics may be used advantageously because of their light weight and strength there has arisen a need for resins and laminates made therefrom which will retain to a desirable degree their physical characteristics though they be heated to elevated temperatures. Materials answering such description can be substituted for much more expensive and heavy metal and molded to close tolerances without costly machining.

An object, therefore, of this invention is to provide resinous compositions and laminates made therefrom which retain their physical characteristics after heating to elevated temperatures.

Briefly stated, the invention comprises compositions comprising the reaction product of unsaturated polyesters and an allyl ester of a polycarboxylic acid, said ester being chosen from the group consisting of diallyl isophthalate and triallyl trimesate.

The features of the invention which are believed to be novel are set forth with particularity in the claims appended hereto. However, the invention, both as to its organization and method of operation, together with further objects and advantages thereof, will best be understood by a consideration of the following description.

From a consideration of various factors which enter into the making of a good cross-linking agent for unsaturated polyesters, it would normally be expected that an agent with a symmetrical structure would be better than one having an unsymmetrical molecule. Unexpectedly it was found that of the three diallyl phthalates, ortho, iso and tere-, the unsymmetrical diallyl isophthalate was better than the symmetrical terephthalate as well as the also unsymmetrical orthophthalate. It was also found that diallyl isophthalate cross-linked polyesters approach the symmetrical trifunctional triallyl trimesate treated polyesters in usefulness, such compositions also being a part of this invention.

The unsaturated polyesters of this invention include a wide range of materials and, as is well known, are the products of reaction of a polyhydric alcohol and an unsaturated polycarboxylic acid. Among the polyhydric alcohols which can be used are the various glycols such as ethylene glycol, glycerol, diethylene glycol, propylene glycols, butylene glycols, the erythritols and the like. Typical of the unsaturated polybasic acids which are useful are maleic, fumaric, citraconic, aconitic, itaconic, mesaconic and the like. All of the above alcohols and acids are well known in the art.

Diallyl isophthalate can be secured commercially or conveniently made as follows. Allyl alcohol in the amount of 540 g. (9.3 moles) is placed in a suitable container fitted with a distilling column and mixer. The alcohol is distilled to a boiling point of 96° C. to 97° C., about 25 to 50 cc. of distillate being removed. A small amount (0.2 g.) of bronze powder is added as a polymerization inhibitor. Next sodium methoxide (2.5 g.) and commercial grade dimethyl isophthalate (260 g., 1.3 moles) is added to the allyl alcohol and the mixture heated and stirred until methanol generation stops and the boiling point of the distillate is 96° C. to 97° C. A small amount of white powder which forms is filtered off, more bronze powder added and the remaining allyl alcohol distilled off under reduced pressure. The diallyl isophthalate is a liquid distilling at 153°–156° C. at 2½ mm. Hg pressure or 148° C. at 2 mm. Hg.

When using commercial dimethyl isophthalate to make diallyl isophthalate or the latter itself in commercial form, diallyl terephthalate may be found in the final product. Amounts of up to about 20 percent by weight of diallyl terephthalate in the diallyl isophthalate do not detract seriously from the final polyester-diallyl isophthalate composition. Of course, the diallyl isophthalate may be prepared in any other manner as by preparing dimethyl isophthalate from isophthalic acid and methanol and proceeding as above.

Triallyl trimesate can readily be prepared by the alcoholysis of trimethyl trimesate with excess allyl alcohol. Trimethyl trimesate in turn may be prepared by the reaction of methyl alcohol with commercially available trimesic acid under sulfuric acid catalysis. In preparing triallyl trimesate, 600 g. (10.3 moles) of allyl alcohol is placed in a suitable reaction vessel having a nitrogen bubbler, stirrer and thermometer, the vessel being attached to a distilling column filled with glass helices. A small amount of alcohol is distilled until the boiling point of the distillate is 96° to 97° C., at which time 95 g. (0.38 mole) of dimethyl trimesate and 1 g. sodium methoxide are added, the resultant mixture being heated until the methanol ceases evolving and the boiling point of the distillate is 96° to 97° C. After filtering the solution, the allyl alcohol is removed under reduced pressure and the residue treated at 40° C., 4 millimeters Hg pressure to remove the last trace of allyl alcohol. The residual liquid is dissolved in ether and the latter washed with water to remove any residual catalyst and dried over sodium sulfate. The ether solution is then treated with carbon black to remove any slight amount of coloration and the ether evaporated in a stream of dry air. The resultant white solid triallyl trimesate is melted at 25° to 26° C. and may be recrystallized from a methanol-water mixture at low temperatures if desired.

The unsaturated polyesters as pointed out above can vary widely in composition and include but are not limited to ethylene glycol maleate, propylene glycol maleate, dipropylene glycol maleate, ethylene glycol maleate phthalate and propylene glycol maleate phthalate, dipropylene glycol-tetrahydrofurfuryl alcohol-maleate and ethylene glycol-dicyclopentadiene-maleate. Preferably the unsaturated polyester should have an acid number of from about 25 to 200 although the upper limit may be higher or up to about 300.

The polyesters are prepared in the usual manner. For example, ethylene glycol maleate may be prepared by mixing, by weight, 372.4 g. (6 moles) ethylene glycol and 588.4 g. (6 moles) maleic anhydride and heating and stirring for about five hours at from 140° C. to 225° C. under an inert atmosphere to an acid number of 122. Of course, by cooking the ingredients a longer or shorter period, a lower or higher acid number may be obtained. The dipropylene glycol-tetrahydrofurfuryl alcohol maleate polyester is conveniently made, for example, by reacting in a similar manner 40 g. maleic anhydride, 54 g. dipropylene glycol and 6 g. tetrahydrofurfuryl alcohol. A typical ethylene glycoldicyclopentadiene-maleate polyester can be made by treating as above 678 g. maleic anhydride, 450 g. ethylene glycol and 260 g. dicyclopentadiene. Still another typical polyester is one made by combining 678 g. maleic anhydride, 427.5 g. ethylene glycol and 26.4 g. 2-butenediol 1-4. An ethylene glycol maleate type polyester modified with isophthalic acid may also be used. Such a resin may be prepared by reacting 427.8 g. (6.93 moles) ethylene glycol, 539.0 g. (5.5 moles) maleic anhydride and 182.6 g. (1.1 moles) isophthalic acid.

The relative amounts of unsaturated polyester and monomer or allyl esters are adjusted so that the ratio of double bonds in the polyester to the double bonds in the monomer is constant. In general from 20 to 80 percent by weight of monomer or allyl ester can be efficaciously used. About one percent by weight, based on the total weight of resin, of a curing agent is added. Such curing agents are well known to those skilled in the art and include various peroxide and perbenzoate materials among others. In the present instance t-butyl perbenzoate was typically used.

When using ethylene glycol maleate as the unsaturated polyester, 88.6 g. are used for each 131.4 g. of diallyl isophthalate. In the case of triallyl trimesate 94.5 g. of the ethylene glycol maleate are used for each 125.5 g. of the triallyl trimesate. When using dipropylene glycol-tetrahydrofurfuryl alcohol-maleate with diallyl ester, 125 g. of the polyester are used with 131.4 g. of the ester. Using the triallyl trimesate in this case 134 g. of the polyester are used per 125.5 g. of the trimesate.

In order to demonstrate the favorable qualities of our improved resin combination laminates of glass cloth having thirteen plies 7.25″ x 8.5″ in dimension were made. Each ply was coated with the resin and cured for about one hour at about 160° C. in a mold having a one-eighth inch positive stop. Small sections of the laminate were cut and tested, after aging, for flexural strength in a Tinius Olsen Tester.

Shown in Table I below are data obtained when laminates made as above from resins comprising ethylene glycol maleate of acid number 122 and the allyl esters indicated were tested after aging at 260° C. for the number of hours indicated. The laminate samples were one-eighth inch thick, three inches long and one-half inch wide.

Table I

| Cross linking agent | Composition of resins | | Average room temperature flexural strength (p.s.i.×10⁻³) after aging at 260° C. | | | | | |
|---|---|---|---|---|---|---|---|---|
| | Parts monomer | Parts polyester | Hours | | | | | |
| | | | 0 | 7 | 50 | 100 | 200 | 500 |
| Diallyl orthophthalate | 131.4 | 88.6 | 54.0 | 25.3 | 6.0 | 3.4 | 0.6 | (¹) |
| Diallyl isophthalate | 131.4 | 88.6 | 52.1 | 39.2 | 22.0 | 18.1 | 12.2 | 4.7 |
| Diallyl terephthalate | 131.4 | 88.6 | 39.8 | 27.4 | 16.6 | 14.4 | 9.8 | 3.3 |
| Triallyl trimesate | 125.5 | 94.5 | 45.4 | 36.2 | 22.7 | 25.4 | 20.3 | 13.4 |
| Styrene | 122.4 | 97.6 | 20.0 | 8.0 | 8.0 | (²) | (²) | (²) |

¹ No samples tested.
² Taken off test.

From the above it will at once be evident that the diallyl isophthalate and triallyl trimesate treated polyesters are by far superior to those treated with diallyl orthophthalate in flexural strength especially after treating at elevated temperatures as indicated. The data for styrene is included to point out the improvements gained over another commonly used material.

Table II below shows the flexural strength after aging the materials of Table I at 200° C. for various times as indicated.

Table II

| Cross linking agent or formulation | Average room temperature flexural strength (p.s.i.×10⁻³) after aging at 200° C. | | |
|---|---|---|---|
| | 0 hours | 1,050 hours | 2,050 hours |
| Diallyl orthophthalate | 60.9 | 9.5 | 5.2 |
| Diallyl isophthalate | 62.6 | 20.5 | 17.7 |
| Diallyl terephthalate | 42.4 | 13.6 | 13.7 |
| Triallyl trimesate | 45.4 | 26.3 | 19.3 |
| Styrene | 20.0 | 7.4 | 7.7 |

Again from Table II the superior qualities of the present diallyl isophthalate and triallyl trimesate containing polyesters are made at once apparent.

Shown in Table III below is the average weight loss (based on resin content) of the laminates of Table I.

Table III

| Cross linking agent or formulation | Average percent resin content of laminates | Average percent weight loss based on resin content after aging at 260° C. | | | | |
|---|---|---|---|---|---|---|
| | | Hours | | | | |
| | | 7 | 50 | 100 | 200 | 500 |
| Diallyl orthophthalate | 33.2 | 39.6 | 69.6 | 75.9 | 77.8 | (¹) |
| Diallyl isophthalate | 31.5 | 21.0 | 48.1 | 55.5 | 66.8 | 81.4 |
| Diallyl terephthalate | 31.9 | 27.2 | 55.0 | 61.0 | 72.8 | 83.7 |
| Triallyl trimesate | 35.8 | 14.3 | 44.1 | 49.1 | 55.1 | 69.0 |
| Styrene | 24.4 | 39.5 | 68.5 | (¹) | (¹) | (¹) |

¹ No samples tested.

From the above data it will be seen that diallyl isophthalate and triallyl trimesate are superior to the other polyester additives in their ability to retain their substance under high temperatures.

Table IV below shows the corresponding percent weight loss of the materials of Table II after heating for the indicated periods.

Table IV

| Cross linking agent or formulation | Average percent by weight resin content of laminates | Average percent weight loss based on resin content after aging at 200° C. | |
|---|---|---|---|
| | | 1,050 hours | 2,050 hours |
| Diallyl orthophthalate | 33.8 | 67.9 | 78.4 |
| Diallyl isophthalate | 32.1 | 51.1 | 63.5 |
| Diallyl terephthalate | 32.7 | 51.7 | 66.4 |
| Triallyl trimesate | 35.8 | 37.8 | 47.5 |
| Styrene | 24.4 | 48.1 | 66.6 |

Shown in Table V below are flexural strength data corresponding to that shown in Table I except that the unsaturated polyester is dipropylene glycol-tetrahydrofurfuryl alcohol-maleate of acid number 27.8.

Table V

| Cross linking agent | Composition of resins | | Average room temperature flexural strength (p.s.i.×10⁻³) after aging at 260° C. | | | | |
|---|---|---|---|---|---|---|---|
| | Parts monomer | Parts polyester | Hours | | | | |
| | | | 0 | 7 | 50 | 100 | 200 |
| Diallyl orthophthalate | 131.4 | 125 | 53.3 | 13.3 | 2.5 | 0.0 | (¹) |
| Diallyl isophthalate | 131.4 | 125 | 50.4 | (¹) | 11.7 | 9.2 | 5.2 |
| Diallyl terephthalate | 131.4 | 125 | 33.3 | 26.3 | 7.2 | 4.1 | (¹) |
| Triallyl trimesate | 125.5 | 134 | 38.0 | (¹) | 17.2 | 14.8 | 10.7 |
| Styrene | 122.4 | 138 | 47.2 | 10.5 | 2.3 | 3.4 | (¹) |

¹ No samples tested.

As with the ethylene glycol maleate the efficacy of the additives of this invention is brought out strikingly.

Table VI shows the average percent weight loss of laminates (based on resin content) of the laminates of Table V.

Table VI

| Cross linking agent | Average percent by weight resin content of laminates | Average percent weight loss based on resin content after aging at 260° C. | | | |
|---|---|---|---|---|---|
| | | Hours | | | |
| | | 7 | 50 | 100 | 200 |
| Diallyl orthophthalate | 29.2 | 60.8 | 78.0 | 76.7 | (¹) |
| Diallyl isophthalate | 30.4 | (¹) | 53.1 | 59.1 | 69.7 |
| Diallyl terephthalate | 29.8 | 36.6 | 60.6 | 64.6 | (¹) |
| Triallyl trimesate | 33.3 | (¹) | 39.6 | 43.1 | 49.0 |
| Styrene | 27.1 | 49.7 | 64.8 | 68.1 | (¹) |

¹ No samples tested.

Not only are the unsaturated polyester-allyl ester combinations described herein useful for laminating but for molding and other purposes as well. A typical molding composition comprises 22.1 g. diallyl isophthalate, 14.9 g. ethylene glycol maleate, 44.5 g. clay and 18.5 g. of one-half inch long glass fibers. The ingredients are kneaded together, the mixture having been previously catalyzed with 1.5 percent by weight t-butyl perbenzoate based on the resin weight. When molded for about 45 minutes at 135° C. and approximately 5,000 pounds per square inch and then aged for 50 hours at 260° C. it is found that the lost resin amounts to only 26.5 percent as compared with a 67 percent loss for another commercially available product. It will be realized that the ingredients in a molding composition may be widely varied depending upon their end use.

It will be seen that by using specific allyl polycarboxylic esters in conjunction with unsaturated polyesters, namely, diallyl isophthalate and triallyl trimesate, we have provided resin combinations which are substantially improved over those using diallyl orthophthalate and diallyl terephthalate and other commonly used materials.

What we claim as new and desire to secure by Letters Patent of the United States is:

1. A composition comprising the reaction product consisting of by weight (1) from 80% to 20% of an ethylenically unsaturated polyester resin selected from the group consisting of ethylene glycol maleate, propylene glycol maleate, dipropylene glycol maleate, ethylene glycol maleate phthalate, propylene glycol maleate phthalate, dipropylene glycol tetrahydrofurfuryl alcohol-maleate and ethylene glycol dicyclopentadiene maleate and mixtures thereof and (2) from 20% to 80% of diallyl isophthalate said reaction product having been heat cured for about one hour at about 160° C.

2. A composition comprising the reaction product of by weight (1) from 80% to 20% dipropylene glycol tetrahydrofurfuryl alcohol-maleate resin and (2) from 20% to 80% of diallyl isophthalate said reaction product having been heat cured for about one hour at about 160° C.

3. A composition comprising the reaction product consisting of by weight (1) from 80% to 20% ethylene glycol maleate resin and (2) from 20% to 80% of diallyl isophthalate said reaction product having been heat cured for about one hour at about 160° C.

4. A laminated structure impregnated with a composition comprising the reaction product consisting of by weight (1) 80% to 20% of an ethylenically unsaturated polyester resin selected from the group consisting of ethylene glycol maleate, propylene glycol maleate, dipropylene glycol maleate, ethylene glycol maleate phthalate, propylene glycol maleate phthalate, dipropylene glycol tetrahydrofurfuryl alcohol-maleate, ethylene glycol dicyclopentadiene maleate and mixtures thereof and (2) from 20% to 80% diallyl isophthalate said reaction product having been heat cured for about one hour at about 160° C.

5. A molded article comprising the reaction product consisting of by weight (1) 80% to 20% of an ethylenically unsaturated polyester resin selected from the group consisting of ethylene glycol maleate, propylene glycol maleate, dipropylene glycol maleate, ethylene glycol maleate phthalate, propylene glycol maleate phthalate, dipropylene glycol tetrahydrofurfuryl alcohol-maleate and ethylene glycol dicyclopentadiene maleate and mixtures thereof and (2) from 20% to 80% diallyl isophthalate said reaction product having been heat cured for about one hour at about 160° C.

References Cited in the file of this patent

UNITED STATES PATENTS

| | | |
|---|---|---|
| 2,428,787 | D'Alelio | Oct. 14, 1947 |
| 2,528,235 | Loritsch | Oct. 31, 1950 |
| 2,632,753 | Anderson | Mar. 24, 1953 |
| 2,806,014 | Beavers | Sept. 10, 1957 |